(12) United States Patent
Baik

(10) Patent No.: US 8,457,198 B2
(45) Date of Patent: Jun. 4, 2013

(54) METHOD OF AND APPARATUS FOR DECIDING ENCODING MODE FOR VARIABLE BLOCK SIZE MOTION ESTIMATION

(75) Inventor: Hyun-ki Baik, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1394 days.

(21) Appl. No.: 11/650,451

(22) Filed: Jan. 8, 2007

(65) Prior Publication Data

US 2007/0171974 A1    Jul. 26, 2007

(30) Foreign Application Priority Data

Jan. 23, 2006    (KR) .......................... 10-2006-0006806

(51) Int. Cl.
 *H04N 7/12* (2006.01)
(52) U.S. Cl.
 USPC ................................. 375/240.12; 375/240.24
(58) Field of Classification Search
 USPC ............................ 375/240.16, 240.12, 240.24
 See application file for complete search history.

(56) References Cited

U.S. PATENT DOCUMENTS

| | | | |
|---|---|---|---|
| 6,084,908 A | | 7/2000 | Chiang et al. |
| 6,243,495 B1 * | | 6/2001 | Naveen et al. ................. 382/236 |
| 7,471,725 B2 * | | 12/2008 | Linzer et al. ............. 375/240.16 |
| 2003/0223492 A1 * | | 12/2003 | Drezner et al. ............ 375/240.2 |
| 2004/0120400 A1 * | | 6/2004 | Linzer ...................... 375/240.16 |
| 2005/0013367 A1 | | 1/2005 | Gallant et al. |

FOREIGN PATENT DOCUMENTS

WO    WO 2005006762 A2 *    1/2005

OTHER PUBLICATIONS

Kankanhalli, Mohan S. et al. "Content Based Watermarking of Images".
Yu, Andy C. "Efficient Block-Size Selection Algorithm for Inter-Frame Coding in H.264/MPEG-4 AVC", IEEE, 2004, pp. 169-172; 10 pages total.

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

Provided are a method of and an apparatus for deciding an encoding mode for variable block size motion estimation, which can decide an encoding mode quickly and with less computation during variable block size motion estimation. The method includes searching in a reference frame for a macroblock that is most similar to a current macroblock, selecting a temporary encoding mode candidate group for encoding of the current macroblock from among a plurality of encoding mode candidate groups including at least one encoding mode, using encoding mode information of the searched-for macroblock of the reference frame, selecting the decided temporary encoding mode candidate group or an encoding mode candidate group including an encoding mode using a smaller block than the decided temporary encoding mode candidate group as a final encoding mode candidate group, based on the temporary encoding mode candidate group, the complexity of the current macroblock or sub-blocks obtained by dividing the current macroblock, and the difference between the current macroblock or each of the sub-blocks and the reference frame, and performing motion estimation in encoding mode included in the final encoding mode candidate group and deciding an encoding mode of the current macroblock.

20 Claims, 6 Drawing Sheets

| ENCODING MODE CANDIDATE GROUP | INCLUDED ENCODING MODE |
|---|---|
| FIRST ENCODING MODE CANDIDATE GROUP (MD16) | INTER 16x16 |
| SECOND ENCODING MODE CANDIDATE GROUP (MD8) | INTER 16x16, INTER 16x8, INTER 8x16, INTER 8x8 |
| THIRD ENCODING MODE CANDIDATE GROUP (MD4) | INTER 16x16, INTER 16x8, INTER 8x16, INTER 8x8 INTER 8x4, INTER 4x8, INTER 4x4 |

METHOD OF AND APPARATUS FOR DECIDING ENCODING MODE FOR VARIABLE BLOCK SIZE MOTION ESTIMATION

CROSS-REFERENCE TO RELATED PATENT APPLICATION

This application claims priority from Korean Patent Application No. 10-2006-0006806, filed on Jan. 23, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding of video data, and more particularly, to a method of and an apparatus for deciding an encoding mode for variable block size motion estimation, which can decide an encoding mode quickly and with less computation during variable block size motion estimation.

2. Description of the Related Art

In video compression standards such as moving picture expert group (MPEG)-1, MPEG-2, MPEG-4 Visual, H.261, H.263, and H.264/MPEG-4 advanced video coding (AVC), a frame is generally divided into a plurality of macroblocks. Next, prediction is performed on each of the macroblocks to obtain a prediction block, and the difference between the original block and the prediction block is transformed and quantized for video data compression.

There are two types of prediction: intraprediction and interprediction. In intraprediction, a current block is predicted using data of its neighboring blocks in the current frame. In interprediction, a prediction block of the current block is generated from one or more video frames that have been encoded using block-based motion compensation. H.264/MPEG-4 AVC uses interprediction to perform motion estimation using seven variable block size modes from 4×4 to 16×16, instead of a fixed block size mode.

FIG. 1 illustrates blocks of various sizes used in variable block size motion estimation of related art H.264/MPEG-4 AVC, and FIG. 2 illustrates a variable block size motion estimated image according to the related art.

As illustrated in FIG. 1, a luminance component (16×16 sample) of a macroblock may be divided according to four methods: into one 16×16 macroblock partition, two 16×8 macroblock partitions, two 8×16 macroblock partitions, or four 8×8 macroblock partitions for motion estimation. If an 8×8 mode is selected, four 8×8 sub-macroblocks of a macroblock may each be sub-divided according to four methods: into one 8×8 sub-macroblock partition, two 8×4 sub-macroblock partitions, two 4×8 sub-macroblock partitions, or four 4×4 sub-macroblock partitions. In each macroblock, a large number of combinations of partitions and sub-macroblocks are available. A method of dividing a macroblock into sub-blocks of various sizes is called tree structured motion compensation.

Referring to FIG. 2, in an image, a block having low energy is motion estimated using a large partition and a block having high energy is motion estimated using a small partition. Selecting a large partition (of 16×16, 16×8, or 8×16) means that the number of bits required to indicate the motion vector and type of the selected partition is small, but motion compensated error data of a frame region including a fine image may include a large amount of energy. If a small partition (of 8×4 or 4×4) is selected, the motion compensated error data has a small amount of energy, but a large number of bits are required to indicate the motion vector and type of the selected partition. Thus, the selection of the partition size has a great influence on compression performance.

To decide the optimal encoding mode for a macroblock, H.264 uses rate-distortion (RD) optimization. A general equation for RD optimization is as follows:

$$J_{mode} = D + \lambda_{mode} \cdot R \qquad (1),$$

where $J_{mode}$ is an RD cost, $\lambda_{mode}$ is a Lagrangian multiplier, D is a distortion value between the original macroblock and a reconstructed macroblock, and R is a coefficient reflecting the number of bits related to mode selection and a quantization value of a macroblock. A macroblock is divided into various variable blocks and encoded, and the mode having the minimum RD cost is selected as the optimal encoding mode using Equation 1.

However, all modes of motion estimation must be tried to select the optimal encoding mode, which increases the amount and complexity of computation. Therefore, there is a need for an encoding mode decision method capable of reducing the complexity of computation and thus rapidly and accurately deciding an encoding mode.

SUMMARY OF THE INVENTION

The present invention provides a method of and an apparatus for deciding an encoding mode, which, during variable block size motion estimation, can select an encoding mode from among all available encoding modes based on the complexity of a block to be encoded and correlation between the block and a previous frame, thereby reducing the amount of computation and allowing rapid encoding mode decision.

According to one aspect of the present invention, there is provided a method of deciding an encoding mode. The method includes searching in a reference frame for a macroblock that is most similar to the current macroblock, selecting a temporary encoding mode candidate group for encoding the current macroblock from among a plurality of encoding mode candidate groups including at least one encoding mode, using encoding mode information of the searched-for macroblock of the reference frame, selecting the temporary encoding mode candidate group or an encoding mode candidate group including an encoding mode using a smaller block than the temporary encoding mode candidate group as a final encoding mode candidate group, based on the temporary encoding mode candidate group, the complexity of the current macroblock or sub-blocks obtained by dividing the current macroblock, and the difference between the current macroblock or each of the sub-blocks and the reference frame, and performing motion estimation in encoding modes included in the final encoding mode candidate group and deciding an encoding mode of the current macroblock.

According to another aspect of the present invention, there is provided an apparatus for deciding an encoding mode for variable block size motion estimation. The apparatus includes a temporary encoding mode candidate group decision unit, a calculation unit, a final encoding mode candidate group selection unit, and an encoding mode decision unit. The temporary encoding mode candidate group decision unit searches in a reference frame for a macroblock that is most similar to the current macroblock and selects a temporary encoding mode candidate group for encoding the current macroblock from among a plurality of encoding mode candidate groups including at least one encoding mode, using encoding mode information of the searched-for macroblock of the reference frame. The calculation unit calculates the complexity of the current macroblock or sub-blocks obtained by dividing the current macroblock and the difference between the current macroblock or each of the sub-blocks and the reference frame. The final encoding mode candidate group selection unit selects the temporary encoding mode candidate group or an encoding mode candidate group including an encoding mode using a smaller block than the temporary encoding mode candidate group as a final encoding mode candidate group, based on the temporary encoding mode candidate group, the complexity of the current macroblock or sub-blocks obtained by dividing the current macroblock, and the difference between the current macroblock or each of the sub-blocks and the reference frame. The encoding mode decision unit performs motion estimation in encoding modes included in the final encoding mode candidate group and decides an encoding mode of the current macroblock.

BRIEF DESCRIPTION OF THE DRAWINGS

The above and other aspects of the present invention will become more apparent by describing in detail an exemplary embodiment thereof with reference to the attached drawings, in which.

DETAILED DESCRIPTION OF EXEMPLARY EMBODIMENTS

An exemplary embodiment of the present invention will now be described in detail with reference to the accompanying drawings.

Figure 3:
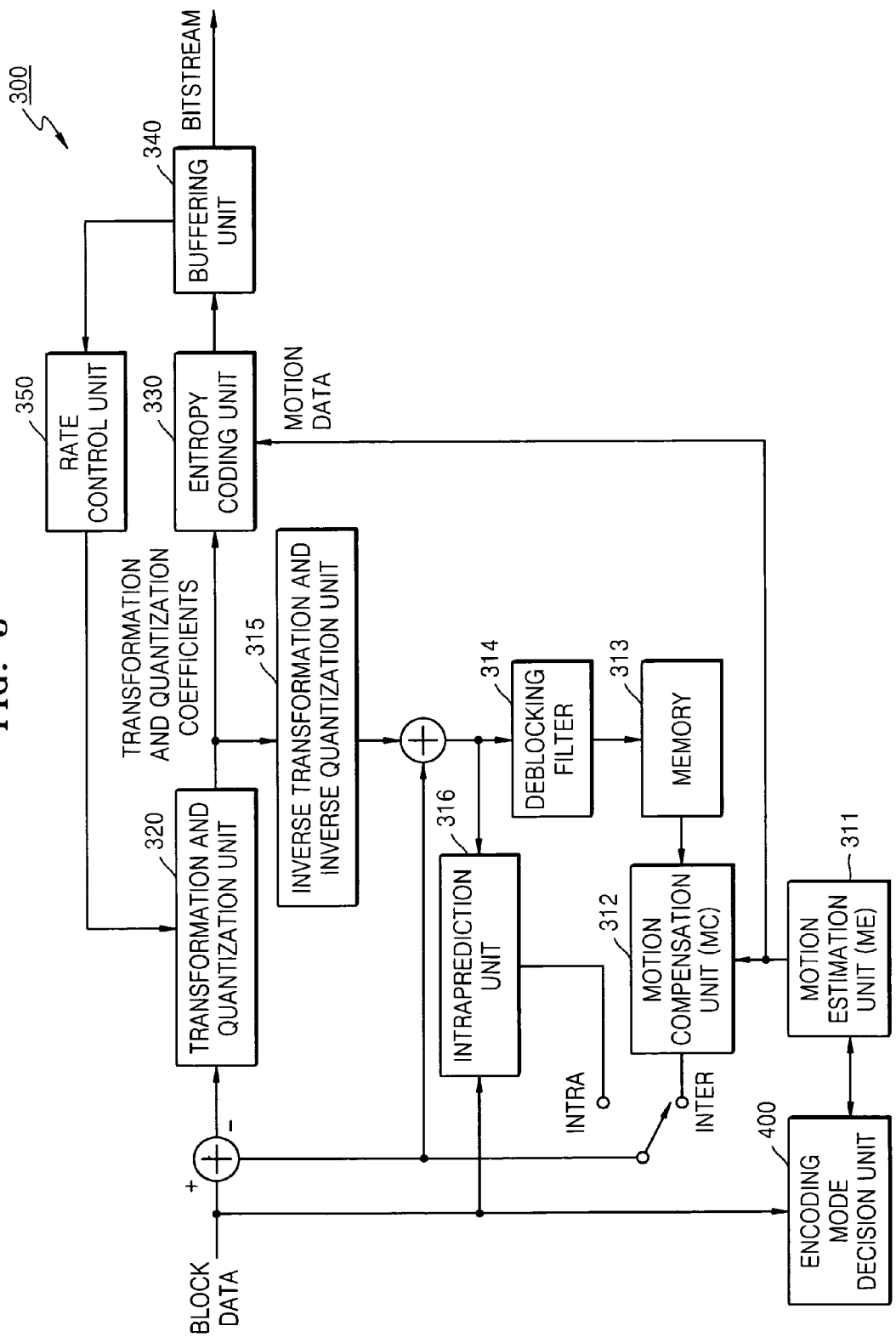
FIG. 3 is a block diagram of a video encoder incorporating an apparatus for deciding an encoding mode according to an exemplary embodiment of the present invention.

FIG. 3 is a block diagram of a video encoder 300 incorporating an apparatus for deciding an encoding mode according to an exemplary embodiment of the present invention. Referring to FIG. 3, the video encoder 300 includes a motion estimation unit 311, a motion compensation unit 312, a memory 313, a deblocking filter 314, an inverse transform and inverse quantization unit 315, an intraprediction unit 316, a transformation and quantization unit 320, an entropy coding unit 330, a buffering unit 340, a rate control unit 350, and an encoding mode decision unit 400. In FIG. 3, the apparatus for deciding an encoding mode according to an exemplary embodiment of the present invention is the encoding mode decision unit 400.

The motion estimation unit 311 and the motion compensation unit 312 perform motion estimation and compensation on each input macroblock. The motion estimation refers to predicting a current macroblock using a previous reference frame stored in the memory 313. The motion estimation unit 311 performs motion estimation according to an encoding mode decided by the encoding mode deciding unit 400.

The intraprediction unit 316 performs intraprediction on each input macroblock. The transformation and quantization unit 320 performs transformation and quantization on a residue between interpredicted or intrapredicted video data and the original video data, to output a transformation block composed of quantized transformation coefficients. The entropy coding unit 330 performs variable length coding on the transformation block, and the coded transformation block is stored in the buffering unit 340 and then output as a bitstream. The rate control unit 350 monitors the flow of data stored in the buffering unit 340 and controls a quantization coefficient of the transformation and quantization unit 320, thereby controlling the bit rate.

The encoding mode deciding unit 400 according to an exemplary embodiment of the present invention searches in a reference frame for a macroblock that is most similar to the current macroblock, before the motion estimation unit 311 performs motion estimation, and selects a temporary encoding mode candidate group including the encoding mode of the found macroblock. The encoding mode deciding unit 400 selects a final encoding mode candidate group to be actually motion estimated, using the temporary encoding mode candidate group, the complexity of the current macroblock, and the difference between the current macroblock and its corresponding macroblock in a previous frame, and compares RD costs in encoding modes included in the final encoding mode candidate group to decide the optimal encoding mode.

Figure 4:
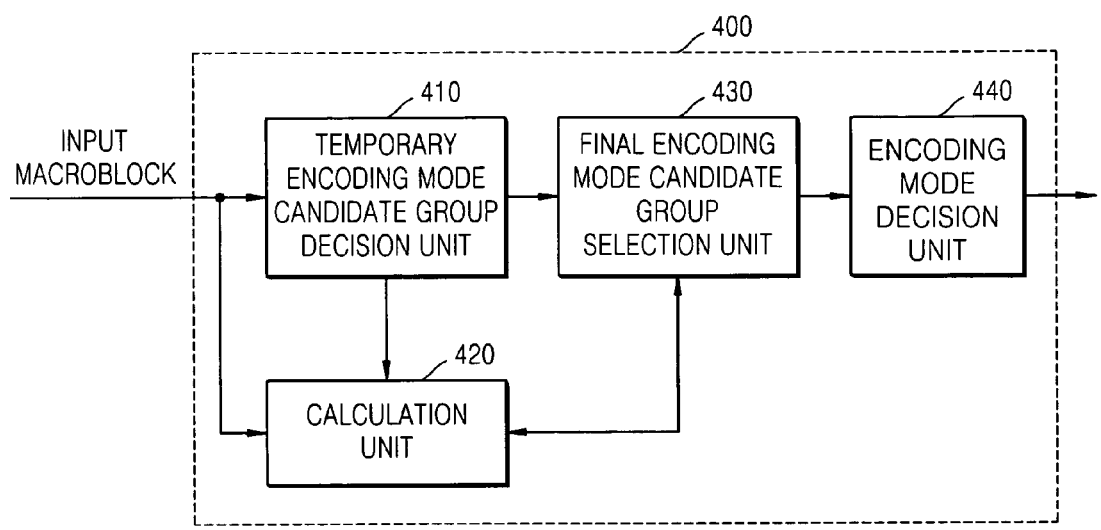
FIG. 4 is a block diagram of an apparatus for deciding an encoding mode according to an exemplary embodiment of the present invention.
Figure 5:
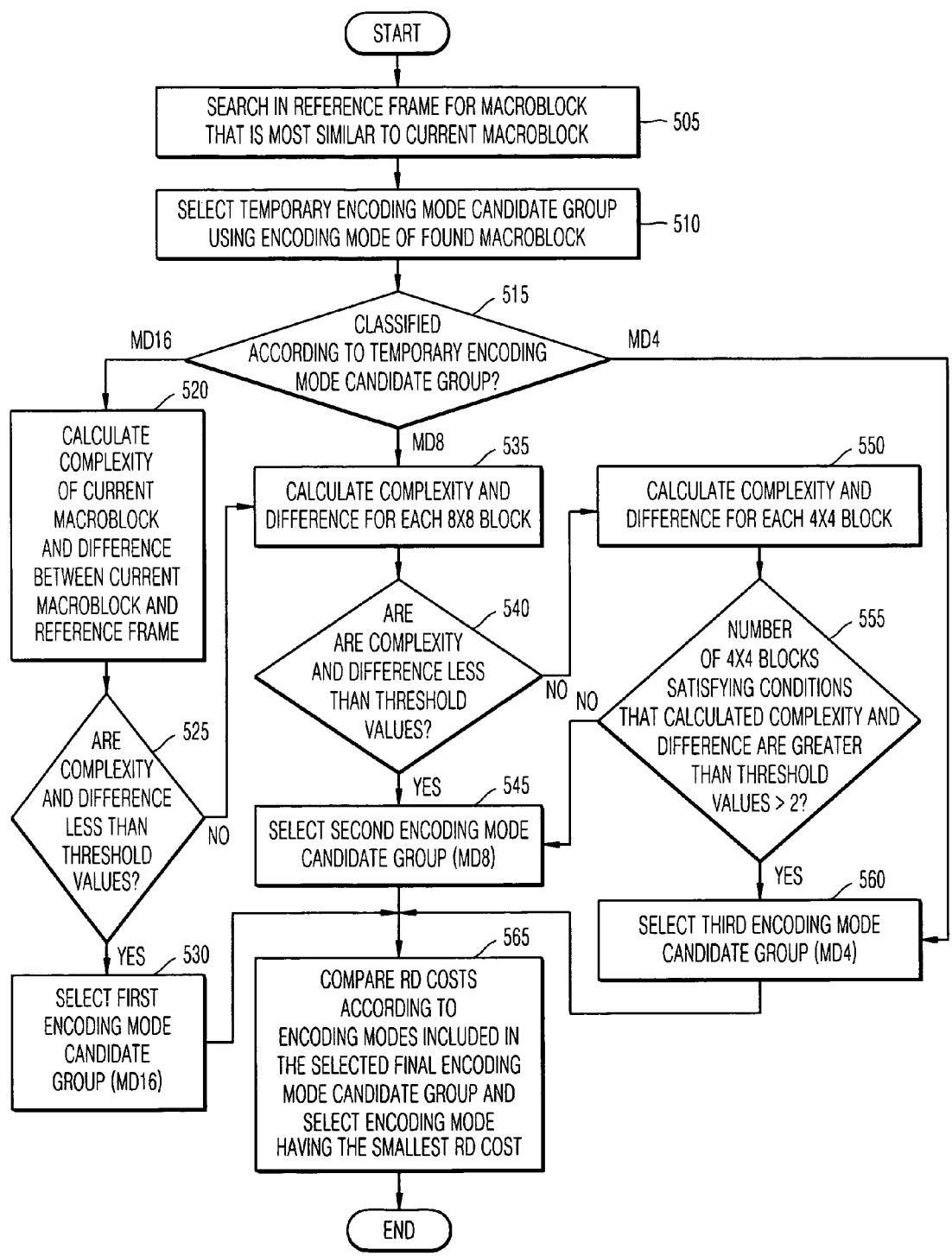
FIG. 5 is a flowchart illustrating a method of deciding an encoding mode according to an exemplary embodiment of the present invention.

FIG. 4 is a block diagram of the apparatus for deciding an encoding mode (the encoding mode decision unit 400) according to an exemplary embodiment of the present invention, and FIG. 5 is a flowchart illustrating a method of deciding an encoding mode according to an exemplary embodiment of the present invention. FIGS. 4 and 5 will now be used to describe the apparatus for and a method of deciding an encoding mode according to an exemplary embodiment of the present invention.

The encoding mode decision unit 400 includes a temporary encoding mode candidate group decision unit 410, a calculation unit 420, a final encoding mode candidate group selection unit 430, and an encoding mode decision unit 440.

In operation 505, the temporary encoding mode candidate group decision unit 410 searches in a previous reference frame for a macroblock that is most similar to the current macroblock.

In operation 510, the temporary encoding mode candidate group decision unit 410 selects a temporary encoding mode candidate group including all encoding modes of the found macroblock from among a plurality of encoding mode candidate groups including at least one encoding mode. The process of selecting the temporary encoding mode candidate group will now be described in more detail with reference to FIGS. 6 and 7.

Figure 6:
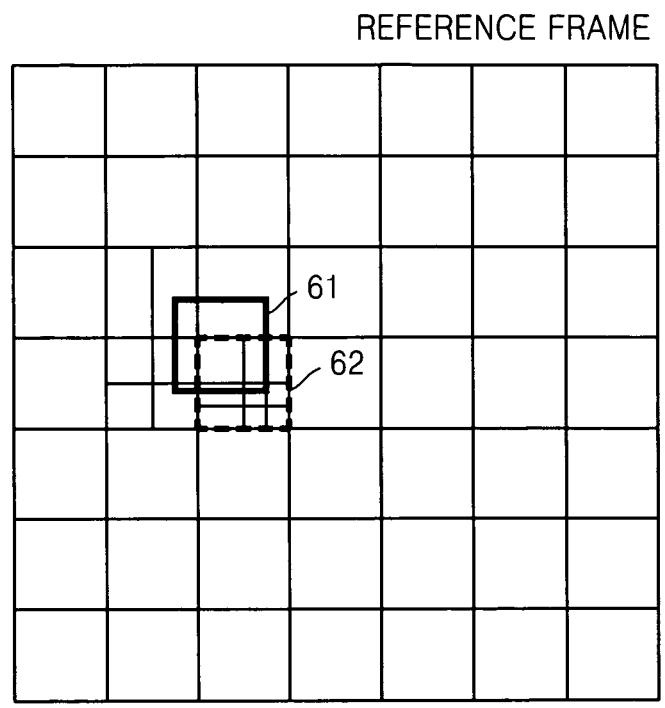
FIG. 6 is a diagram for explaining the process of deciding a temporary encoding mode candidate group according to an exemplary embodiment of the present invention.
Figure 7:
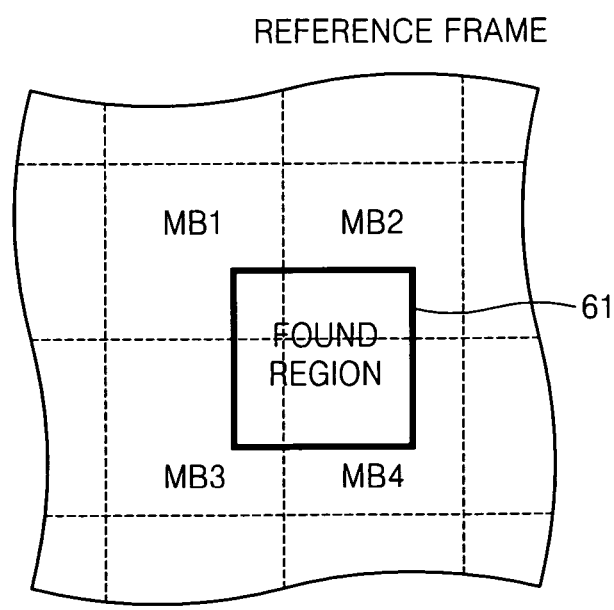
FIG. 7 is an enlargement of an overlapping region of FIG. 6 according to an exemplary embodiment of the present invention.

FIG. 6 is a diagram for explaining the process of selecting the temporary encoding mode candidate group according to an exemplary embodiment of the present invention, and FIG. 7 is an enlargement of an overlapping region of FIG. 6. Referring to FIG. 6, the temporary encoding mode candidate group decision unit 410 searches in a reference frame for a region that is most similar to the current macroblock. This searching may be performed in a similar manner to general motion estimation. As a result of the searching, if a found region 61 overlaps a plurality of macroblocks as illustrated in FIG. 6, the macroblock having the largest overlap with the found region 61 is selected as the found macroblock. Referring to FIG. 7, when the found region 61 overlaps four macroblocks MB1 through MB4, the macroblock MB4 having the largest overlap with the found region 61 is selected as the found macroblock. The temporary encoding mode candidate group decision unit 410 selects a temporary encoding mode candidate group including all encoding modes of the found macroblock MB4. The encoding mode candidate group will now be described with reference to FIG. 8.

Figures 8, 9:
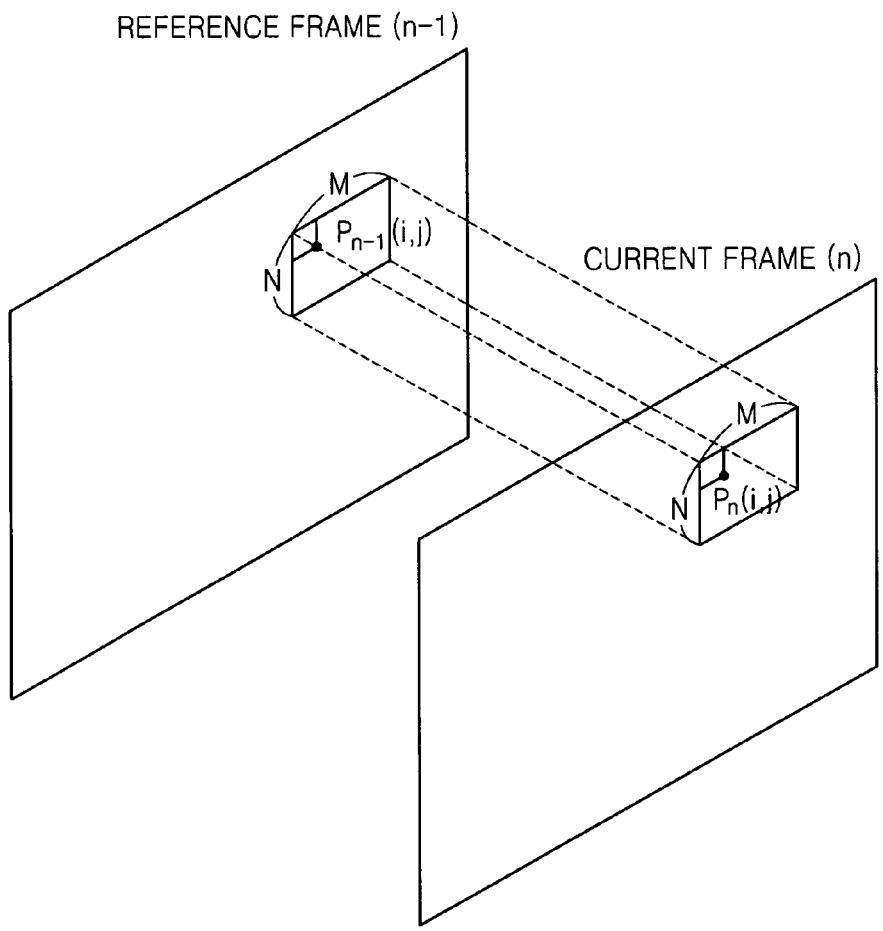
FIG. 8 illustrates encoding mode candidate groups according to an exemplary embodiment of the present invention.
FIG. 9 is a diagram for explaining the process of calculating a temporal difference between a current macroblock and its corresponding macroblock in a previous reference frame according to an exemplary embodiment of the present invention.

FIG. 8 illustrates the encoding mode candidate group according to an exemplary embodiment of the present invention.

Referring to FIG. 8, the encoding mode candidate group can include a first encoding mode candidate group MD16 including an inter 16×16 mode, a second encoding mode candidate group MD8 including the inter 16×16 mode, an inter 16×8 mode, an inter 8×16 mode, and an inter 8×8 mode, and a third encoding mode candidate group MD4 including the inter 16×16 mode, the inter 16×8 mode, the inter 8×16 mode, the inter 8×8 mode, an inter 8×4 mode, an inter 4×8 mode, and an inter 4×4 mode.

Figure 1:
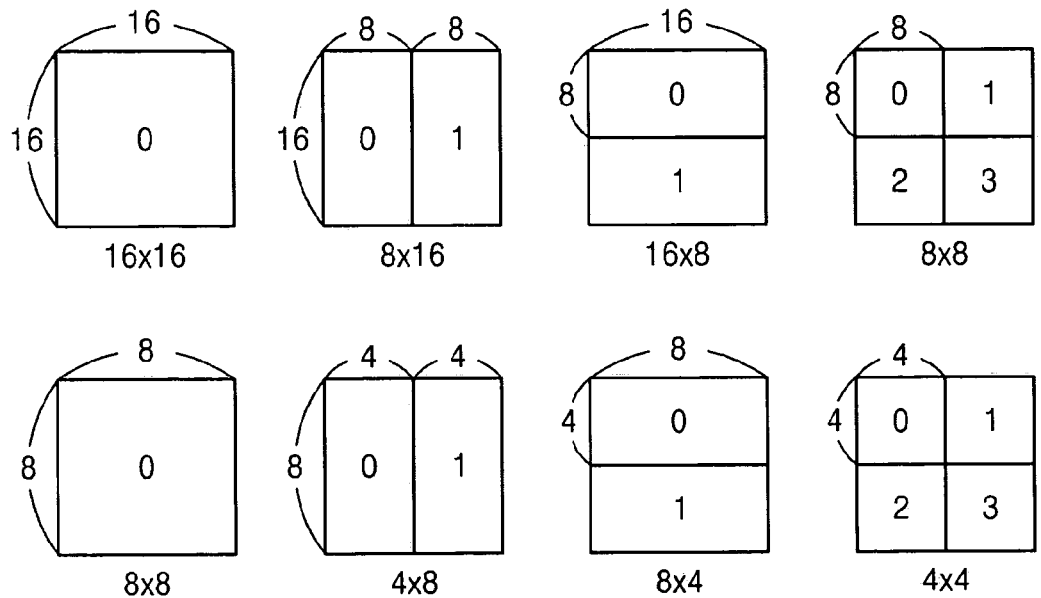
FIG. 1 illustrates blocks of various sizes used in variable block size motion estimation of related art H.264/MPEG-4 AVC.
Figure 2:
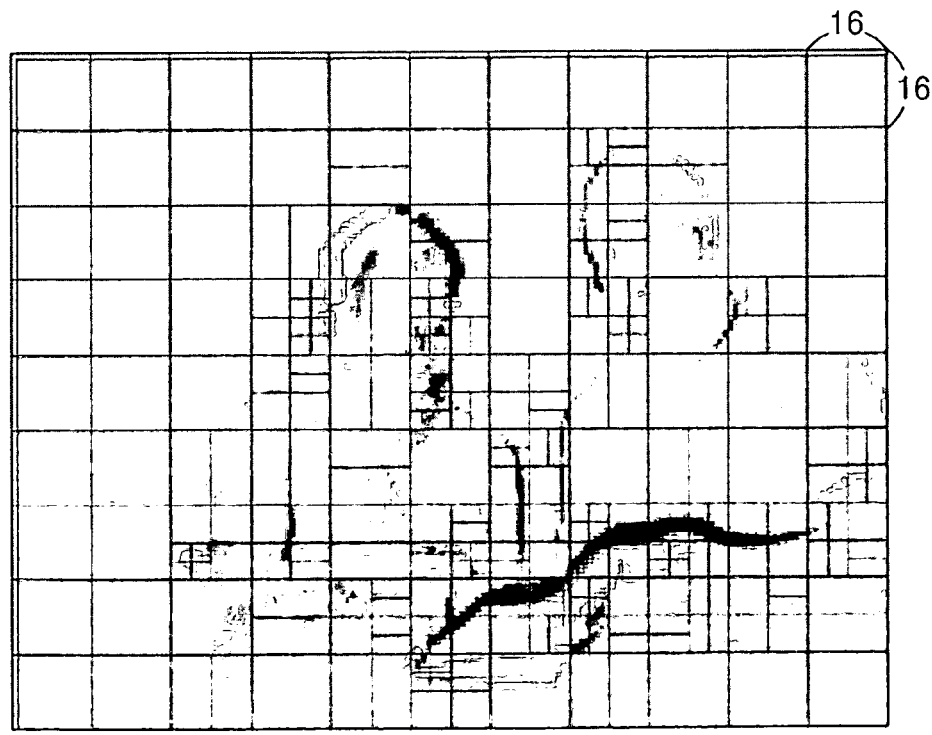
FIG. 2 illustrates a variable block size motion estimated image according to the related art.

In general, encoding modes of a macroblock for motion estimation include the inter 16×16 mode, the inter 16×8 mode, the inter 8×16 mode, the inter 8×8 mode, the inter 8×4 mode, the inter 4×8 mode, and the inter 4×4 mode. An inter M×N mode means a mode in which motion estimation is performed using M×N variable blocks illustrated in FIG. 1. Conventionally, for encoding mode decision, motion estimation is performed on each macroblock in all the encoding modes and the RD costs of the encoding modes are compared, resulting in a large amount of computation. Thus, in an exemplary embodiment of the present invention, instead of comparing the RD costs of all encoding modes, motion estimation is performed only on an encoding mode candidate group including encoding modes classified according to the size of a variable block, and the RD costs of those encoding modes are compared to decide the optimal encoding mode.

Referring back to FIG. 6, the temporary encoding mode candidate group decision unit 410 selects a temporary encoding mode candidate group including all encoding modes of a macroblock 62 that is most similar to the current macroblock. The temporary encoding mode candidate group decision unit 410 selects, using information on the encoding modes of the found macroblock in the previous reference frame, an encoding mode candidate group that uses blocks of the smallest size and includes the smallest number of encoding modes as the temporary encoding mode candidate group. In FIG. 6, since the most similar macroblock 62 includes the inter 4×4 mode, the temporary encoding mode candidate group decision unit 410 selects the third encoding mode candidate group MD4 to be the temporary encoding mode candidate group.

Next, it is determined whether to select an encoding mode candidate group using variable blocks that are smaller than those used in encoding modes included in the temporary encoding mode candidate group. This is done in operation 515 by classifying a process according to the temporary encoding mode candidate group selected in operation 510.

First, if the temporary encoding mode candidate group is the first encoding mode candidate group MD16, the calculation unit 420 calculates the complexity of the current macroblock and the difference between the current macroblock and its corresponding macroblock in the previous reference frame, in operation 520. The complexity of the current macroblock may be calculated using a sum of the squares of AC coefficients but not DC coefficients among discrete cosine transform (DCT) coefficients of the current macroblock. The complexity of the current macroblock is calculated because if the current macroblock has high complexity, it is more efficient for the current macroblock to be divided into smaller blocks for motion estimation in terms of RD cost.

FIG. 9 is a diagram for explaining the process of calculating the temporal difference (TD) between the current macroblock and its corresponding macroblock in the previous reference frame. Referring to FIG. 9, the TD is calculated as follows:

$$TD = \sum_{i,j}^{M,N} |p_n(i,j) - p_{n-1}(i,j)|, \qquad (2)$$

where $p_n(i,j)$ is a pixel value of a pixel at $(i,j)$ in the current macroblock and $p_{n-1}(i,j)$ is a pixel value of a pixel at $(i,j)$ in a corresponding macroblock located at the same position as the current macroblock in the previous reference frame. In Equation 2, the TD can be obtained by calculating the sum of the absolute differences (SAD) between pixel values of the current macroblock and the corresponding macroblock in the previous reference frame. The TD is calculated because if the current macroblock has a larger motion than the previous reference frame and thus has a large residue, the RD cost is reduced if the current macroblock is divided into smaller blocks for motion estimation.

In operation 525, the final encoding mode candidate group selection unit 430 compares the calculated complexity and TD with predetermined threshold values to decide whether to select the second encoding mode candidate group MD8 or the third encoding mode candidate group MD4, which use smaller variable blocks than the first encoding mode candidate group MD16, as a final encoding mode candidate group. More specifically, when the complexity of the current macroblock is $E_{16 \times 16}$, the TD between the current macroblock and its corresponding macroblock in the previous reference frame is $TD_{16 \times 16}$, the complexity threshold value is $TH_{E16 \times 16}$, and the TD threshold value is $TH_{TD16 \times 16}$, the final encoding mode candidate group selection unit 430 selects the first encoding mode candidate group MD16 as a final encoding mode candidate group to be actually motion estimated in operation 530 if conditions $E_{16 \times 16} < TH_{E16 \times 16}$ and $TD_{16 \times 16} < TH_{TD16 \times 16}$ are satisfied.

In operation 535, if the conditions $E_{16 \times 16} < TH_{E16 \times 16}$ and $TD_{16 \times 16} < TH_{TD16 \times 16}$ are not satisfied, i.e. the complexity of the current macroblock is not less than the complexity threshold value or the current macroblock has a large motion, or if the temporary encoding mode candidate group is the second encoding mode candidate group MD8, the final encoding mode candidate group selection unit 430 divides the current macroblock into four 8×8 blocks. The calculation unit 420 calculates the complexity $E_{8 \times 8}$ of each of the 8×8 blocks and the difference $TD_{8 \times 8}$ between the current 8×8 block and its corresponding 8×8 block in the previous reference frame. Here, the complexity and the difference related to the 8×8 blocks and the difference may be calculated in a similar manner used with respect to the 16×16 macroblock.

In operation 540, the final encoding mode candidate group selection unit 430 compares the calculated complexity $E_{8 \times 8}$ and difference $TD_{8 \times 8}$ with predetermined threshold values and decides whether to select the third encoding mode candidate group MD4 using smaller variable blocks than the second encoding mode candidate group MD8 as the final encoding mode group. More specifically, for an 8×8 block, when the complexity threshold value is $TH_{E8\times8}$ and the TD threshold value is $TH_{TD8\times8}$, the final encoding mode candidate group selection unit 430 selects the second encoding mode candidate group MD8 as the final encoding mode candidate group to be actually motion estimated in operation 545 if conditions $E_{8\times8} < TH_{E8\times8}$ and $TD_{8\times8} < TH_{TD8\times8}$ are satisfied.

In operation 550, if the conditions $E_{8\times8} < TH_{E8\times8}$ and $TD_{8\times8} < TH_{TD8\times8}$ are not satisfied, i.e. the complexity of an 8×8 block is not less than the complexity threshold value or the 8×8 block has a large motion, the final encoding mode candidate group selection unit 430 divides the current macroblock into four 4×4 blocks. The calculation unit 420 calculates the complexity $E_{4\times4}$ of each of the 4×4 blocks and the difference $TD_{4\times4}$ between the current 4×4 block and its corresponding 4×4 block in the previous reference frame.

In operation 555, the final encoding mode candidate group selection unit 430 determines the number of 4×4 blocks satisfying the conditions that the complexity $E_{4\times4}$ and the difference $TD_{4\times4}$ are greater than predetermined threshold values, and determines whether that number is greater than a predetermined value. More specifically, if the number of 4×4 blocks satisfying the conditions $E_{4\times4} > TH_{E4\times4}$ and $TD_{4\times4} > TH_{TD4\times4}$ exceeds 2, the final encoding mode candidate group selection unit 430 determines that it is necessary to perform motion estimation using a smaller block and selects the third encoding mode candidate group MD4 as the final encoding mode candidate group to be actually motion estimated in operation 560. If the number of 4×4 blocks satisfying the conditions does not exceed 2, the final encoding mode candidate group selection unit 430 selects the second encoding mode candidate group MD8 as the final encoding mode candidate group.

If the temporary encoding mode candidate group decided in operation 510 is the third encoding mode candidate group MD4, it means that there is no encoding mode candidate group using a smaller block. Thus, the final encoding mode candidate group selection unit 430 selects the third encoding mode candidate group MD4 as the final encoding mode candidate group to be actually motion estimated.

In operation 565, the encoding mode decision unit 440 performs motion estimation in encoding modes included in the selected final encoding mode candidate group, compares the RD costs of the encoding modes, and selects the encoding mode having the smallest RD cost. For example, if the final encoding mode candidate group selected by the final encoding mode candidate group selection unit 430 is the second encoding mode candidate group MD8, the encoding mode decision unit 440 performs motion estimation in the inter 16×16 mode, the inter 16×8 mode, the inter 8×16 mode, and the inter 8×8 mode included in the second encoding mode candidate group MD8, compares the RD costs of the encoding modes, and selects the encoding mode having the smallest RD cost.

In the present invention, a temporary encoding mode candidate group is selected using the encoding mode of a macroblock in a previous reference frame which is most similar to the current macroblock, a final encoding mode candidate group is selected based on the complexity of the current macroblock or sub-blocks obtained by dividing the current macroblock and a TD indicating motion information, and motion estimation is performed only in encoding modes included in the selected final encoding mode candidate group. As a result, less computation is required for encoding modes, and the efficiency and accuracy of encoding mode decision are increased, based on correlation between the current macroblock and a previous reference frame.

The present invention can be applied not only to motion estimation in H.264 but also other video encoding methods in which motion estimation is performed using variable block sizes. The present invention can also be applied to selection of an encoding mode of a macroblock from among encoding modes including an intra 16×16 mode, an intra 4×4 mode, and a skip mode as well as selection of an encoding mode for motion estimation. In this case, the 16×16 mode, the intra 4×4 mode, and the skip mode should be added to an encoding mode candidate group and the encoding mode decision unit 440 should calculate the RD costs of the added encoding modes.

As described above, according to the exemplary embodiments of the present invention, during variable block size motion estimation, motion estimation is performed only in encoding modes included in a final encoding mode candidate group selected based on the complexity and motion of the current block, instead of performing motion estimation in all encoding modes, thereby reducing the amount of computation required for encoding mode decision and allowing accurate and efficient encoding mode decision.

Meanwhile, the method of deciding an encoding mode according to the present invention can also be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over a network of coupled computer systems so that the computer-readable code is stored and executed in a decentralized fashion.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of deciding an encoding mode for variable block size motion estimation performed by a computer system, the method comprising operations of:
   (a) searching, using a processor of the computer system in a reference frame for a macroblock that is most similar to a current macroblock;
   (b) selecting a temporary encoding mode candidate group for encoding the current macroblock from among a plurality of encoding mode candidate groups comprising at least one encoding mode, using encoding mode information on the searched-for macroblock of the reference frame;
   (c) selecting the temporary encoding mode candidate group or an encoding mode candidate group comprising an encoding mode using a smaller block than the temporary encoding mode candidate group as a final encoding mode candidate group, based on the temporary encoding mode candidate group, complexity of the current macroblock or sub-blocks obtained by dividing the current macroblock, and difference between the current macroblock or each of the sub-blocks and the reference frame; and (d) performing motion estimation in encoding modes included in the final encoding mode candidate group and deciding an encoding mode of the current macroblock,
wherein operation (a) comprises:
(a1) searching in the reference frame for a region that is most similar to the current macroblock; and
(a2) searching for a macroblock having the largest overlap with a searched-for region if the searched-for region overlaps a plurality of macroblocks in the reference frame,
wherein the operation (b) comprises:
selecting the temporary encoding mode candidate group which includes all encoding modes of the macroblock having the largest overlap with the searched-for region as the temporary encoding mode candidate group for encoding the current macroblock.

2. The method of claim 1, wherein the plurality of encoding mode candidate groups comprises:
a first encoding mode candidate group comprising an inter 16×16 mode;
a second encoding mode candidate group comprising the inter 16×16 mode, an inter 16×8 mode, an inter 8×16 mode, and an inter 8×8 mode; and
a third second encoding mode candidate group comprising the inter 16×16 mode, the inter 16×8 mode, the inter 8×16 mode, the inter 8×8 mode, an inter 8×4 mode, an inter 4×8 mode, and an inter 4×4 mode.

3. The method of claim 1, wherein the difference between the current macroblock or each of the sub-blocks and the reference frame is a sum of absolute differences (SAD) between a pixel value of the current macroblock or each of the sub-blocks and a pixel value of a corresponding block of the reference frame.

4. The method of claim 1, wherein if the selected temporary encoding mode candidate group is a first encoding mode candidate group comprising an inter 16×16 mode, then operation (c) comprises:
(c1) calculating the complexity of the current macroblock and the difference between the current macroblock and its corresponding macroblock of the reference frame; and
(c2) selecting the first encoding mode candidate group as the final encoding mode candidate group if the complexity and the difference calculated in operation (c1) are less than first predetermined threshold values.

5. The method of claim 4, further comprising selecting the encoding mode candidate group, comprising the encoding mode using the smaller block than the first encoding mode candidate group, as the final encoding mode candidate group if the complexity and difference calculated in operation (c1) are not less than the first predetermined threshold values.

6. The method of claim 1, wherein if the selected temporary encoding mode candidate group is a second encoding mode candidate group comprising an inter 16×16 mode, an inter 16×8 mode, an inter 8×16 mode, and an inter 8×8 mode, operation (c) comprises:
(c1) dividing the current macroblock into four 8×8 blocks;
(c2) calculating the complexity of each of the 8×8 blocks and the difference between each of the 8×8 blocks and its corresponding block in the reference frame; and
(c3) selecting the second encoding mode candidate group as the final encoding mode candidate group if the complexity and the difference calculated in operation (c2) are less than second predetermined threshold values.

7. The method of claim 6, further comprising:
(c4) dividing each of the 8×8 blocks into four 4×4 blocks if the complexity and the difference calculated in operation (c2) are not less than the second predetermined threshold values;
(c5) calculating complexity of each of the 4×4 blocks and difference between each of the 4×4 blocks and its corresponding block in the reference frame; and
(c6) selecting the second encoding mode candidate group as the final encoding mode candidate group if a number of 4×4 blocks, satisfying conditions that the complexity and the difference calculated in operation (c5) are greater than third predetermined threshold values, is less than a predetermined value.

8. The method of claim 7, further comprising:
(c7) selecting a third encoding mode candidate group comprising an inter 16×16 mode, an inter 16×8 mode, an inter 8×16 mode, an inter 8×8 mode, an inter 8×4 mode, an inter 4×8 mode, and an inter 4×4 mode as the final encoding mode candidate group, if a number of 4×4 blocks satisfying the conditions, that the complexity and the difference calculated in operation (c5) are greater than the third predetermined threshold values, is not less than the predetermined value.

9. The method of claim 1, wherein operation (d) comprises performing motion estimation in the encoding modes included in the final encoding mode candidate group, comparing rate-distortion (RD) costs of the encoding modes, and deciding an encoding mode of the current macroblock.

10. An apparatus for deciding an encoding mode for variable block size motion estimation, the apparatus comprising:
a temporary encoding mode candidate group decision unit which searches in a reference frame for a macroblock that is most similar to a current macroblock and selects a temporary encoding mode candidate group for encoding the current macroblock from among a plurality of encoding mode candidate groups comprising at least one encoding mode, using encoding mode information of the searched-for macroblock of the reference frame;
a calculation unit which calculates complexity of the current macroblock or sub-blocks obtained by dividing the current macroblock, and difference between the current macroblock or each of the sub-blocks and the reference frame;
a final encoding mode candidate group selection unit which selects the temporary encoding mode candidate group or an encoding mode candidate group comprising an encoding mode using a smaller block than the temporary encoding mode candidate group as a final encoding mode candidate group, based on the temporary encoding mode candidate group, the complexity of the current macroblock or sub-blocks obtained by dividing the current macroblock, and the difference between the current macroblock or each of the sub-blocks and the reference frame; and
an encoding mode decision unit which performs motion estimation in encoding modes included in the final encoding mode candidate group and deciding an encoding mode of the current macroblock,
wherein the temporary encoding mode candidate group decision unit searches in the reference frame for a region that is most similar to the current macroblock, searches for a macroblock comprising the largest overlap with the searched-for region if the searched-for region overlaps a plurality of macroblocks in the reference frame and selects the temporary encoding mode candidate group which includes all encoding modes of the macroblock having the largest overlap with the searched-for region as the temporary encoding mode candidate group for encoding the current macroblock.

11. The apparatus of claim 10, wherein the plurality of encoding mode candidate groups comprises:
a first encoding mode candidate group comprising an inter 16×16 mode;
a second encoding mode candidate group comprising the inter 16×16 mode, an inter 16×8 mode, an inter 8×16 mode, and an inter 8×8 mode; and
a third second encoding mode candidate group comprising the inter 16×16 mode, the inter 16×8 mode, the inter 8×16 mode, the inter 8×8 mode, an inter 8×4 mode, an inter 4×8 mode, and an inter 4×4 mode.

12. The apparatus of claim 10, wherein the calculation unit calculates a sum of absolute differences (SAD) between a pixel value of the current macroblock or each of the sub-blocks and a pixel value of a corresponding block of the reference frame as the difference between the current macroblock or each of the sub-blocks and the reference frame.

13. The apparatus of claim 10, wherein if the selected temporary encoding mode candidate group is a first encoding mode candidate group comprising an inter 16×16 mode, the final encoding mode candidate group selection unit selects the first encoding mode candidate group as the final encoding mode candidate group if the complexity of the current macroblock and the difference between the current macroblock and its corresponding macroblock of the reference frame are less than first predetermined threshold values.

14. The apparatus of claim 13, wherein the final encoding mode candidate group selection unit selects the encoding mode candidate group comprising the encoding mode using the smaller block than the first encoding mode candidate group, as the final encoding mode candidate group if the calculated complexity and difference are not less than the first predetermined threshold values.

15. The apparatus of claim 10, wherein if the selected temporary encoding mode candidate group is a second encoding mode candidate group comprising an inter 16×16 mode, an inter 16×8 mode, an inter 8×16 mode, and an inter 8×8 mode, the final encoding mode candidate group selection unit selects the second encoding mode candidate group as the final encoding mode candidate group if the complexity of each of four 8×8 blocks obtained by dividing the current macroblock and the difference between each of the 8×8 blocks and its corresponding block in the reference frame are less than second predetermined threshold values.

16. The apparatus of claim 15, wherein using complexity of each of 4×4 blocks obtained by dividing each of the 8×8 blocks, satisfying conditions that the complexity of each of the 8×8 blocks and the difference between each of the 8×8 blocks and its corresponding block in the reference frame are not less than the second predetermined threshold values, and difference between each of the 4×4 blocks and its corresponding block in the reference frame, if a number of 4×4 blocks, satisfying conditions that the complexity of each of the 4×4 blocks and the difference between each of the 4×4 blocks and its corresponding block in the reference frame are greater than third predetermined threshold values, is less than a predetermined value, the final encoding mode candidate group selection unit selects the second encoding mode candidate group as the final encoding mode candidate group.

17. The apparatus of claim 16, wherein if a number of 4×4 blocks, satisfying the conditions that the complexity of each of the 4×4 blocks and the difference between each of the 4×4 blocks and its corresponding block in the reference frame are greater than the third predetermined threshold values, is not less than the predetermined value, the final encoding mode candidate group selection unit selects a third encoding mode candidate group comprising an inter 16×16 mode, an inter 16×8 mode, an inter 8×16 mode, an inter 8×8 mode, an inter 8×4 mode, an inter 4×8 mode, and an inter 4×4 mode as the final encoding mode candidate group.

18. The apparatus of claim 10, wherein the encoding mode decision unit performs motion estimation in the encoding modes included in the final encoding mode candidate group, compares rate-distortion (RD) costs of the encoding modes, and decides an encoding mode of the current macroblock.

19. The method of claim 1, wherein the complexity of the current macroblock or sub-blocks obtained by dividing the current macroblock comprises a sum of squares of AC coefficients among discrete cosine transform coefficients of the current macroblock.

20. The apparatus of claim 10, wherein the complexity of the current macroblock or sub-blocks obtained by dividing the current macroblock comprises a sum of squares of AC coefficients among discrete cosine transform coefficients of the current macroblock.

* * * * *